United States Patent
Ran et al.

(10) Patent No.: US 11,546,222 B2
(45) Date of Patent: Jan. 3, 2023

(54) MAPPING BETWEEN WIRELESS LINKS AND VIRTUAL LOCAL AREA NETWORKS

(71) Applicant: Hewlett Packard Enterprise Development LP, Houston, TX (US)

(72) Inventors: Guangzhi Ran, Beijing (CN); Qiang Zhou, Beijing (CN); Jianpo Han, Beijing (CN); Wei Huang, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 212 days.

(21) Appl. No.: 16/372,467

(22) Filed: Apr. 2, 2019

(65) Prior Publication Data
US 2019/0312787 A1 Oct. 10, 2019

(30) Foreign Application Priority Data
Apr. 8, 2018 (CN) .......................... 201810306421.5

(51) Int. Cl.
*H04W 56/00* (2009.01)
*H04L 41/12* (2022.01)
(Continued)

(52) U.S. Cl.
CPC .......... *H04L 41/12* (2013.01); *H04L 12/4641* (2013.01); *H04L 61/5007* (2022.05)

(58) Field of Classification Search
CPC .. H04L 41/12; H04L 12/4641; H04L 61/2007
(Continued)

(56) References Cited

U.S. PATENT DOCUMENTS

| 7,339,915 B2 | 3/2008 | Jakkahalli et al. |
| 8,036,195 B2 | 10/2011 | Thompson et al. |

(Continued)

FOREIGN PATENT DOCUMENTS

| CN | 101022392 A | 8/2007 |
| CN | 101022464 A | 8/2007 |

(Continued)

OTHER PUBLICATIONS

Gozdecki J. et al., VIMENO: a Virtualwireless Mesh Network Architecture for Operators, (Research Paper), WINSYS 2013—International Conference on Wireless Information Networks and Systems, 2013, 8 Pgs.

(Continued)

*Primary Examiner* — Sai Ming Chan
(74) *Attorney, Agent, or Firm* — Hewlett Packard Enterprise Patent Department

(57) ABSTRACT

An example first device may include a processor to establish a plurality of links associating between the first network device and a second network device, the plurality of links corresponding to a plurality of virtual local area networks (VLANs) that a plurality of client devices associated with the first network device belong to; create a mapping between the plurality of links and the plurality of VLANs; and forward data received from a particular client device among the plurality of client devices in a particular VLAN of the plurality of VLANs to the second network device via a particular link corresponding to the particular VLAN based on the mapping.

20 Claims, 12 Drawing Sheets

(51) Int. Cl.
*H04L 12/46* (2006.01)
*H04L 61/5007* (2022.01)

(58) Field of Classification Search
USPC .......................................................... 370/254
See application file for complete search history.

(56) References Cited

U.S. PATENT DOCUMENTS

| | | | |
|---|---|---|---|
| 8,248,927 | B2 | 8/2012 | Iyer et al. |
| 9,148,781 | B2 | 9/2015 | LeSage |
| 9,408,061 | B2 | 8/2016 | Unnimadhavan et al. |
| 9,591,676 | B1 * | 3/2017 | Lopes ................. H04W 84/005 |
| 2005/0165953 | A1 * | 7/2005 | Oba ..................... H04L 12/5691 |
| | | | 709/238 |
| 2009/0003213 | A1 | 1/2009 | Tzeng |
| 2013/0315244 | A1 | 11/2013 | Rabie et al. |
| 2014/0269724 | A1 | 9/2014 | Mehler et al. |
| 2016/0150427 | A1 * | 5/2016 | Ramanath ............. H04W 24/06 |
| | | | 370/252 |

FOREIGN PATENT DOCUMENTS

| | | |
|---|---|---|
| CN | 101047583 A | 10/2007 |
| CN | 101150481 A | 3/2008 |
| CN | 101155113 A | 4/2008 |
| CN | 101800691 A | 8/2010 |
| WO | 2013/026384 A1 | 2/2013 |

OTHER PUBLICATIONS

Angus, "Wireless Client Bridging With OpenWRT", available online at <http://projectgus.com/2010/03/wireless-client-bridging-with-openwrt>, Mar. 17, 2010, 15 pages.

Ming, Han, English Abstract on "Application of VLAN technology in Ethernet", China Academic Journal Electronic Publishing House, Mar. 25, 2018, 2 pages.

* cited by examiner

MAPPING BETWEEN WIRELESS LINKS AND VIRTUAL LOCAL AREA NETWORKS

BACKGROUND

In a system, a wireless device may communicate with another wireless device via a corresponding association between them. If the system includes a plurality of virtual local area networks (VLANs), the association may be limited to serve in one specified VLAN.

DETAILED DESCRIPTION

Figure 1:
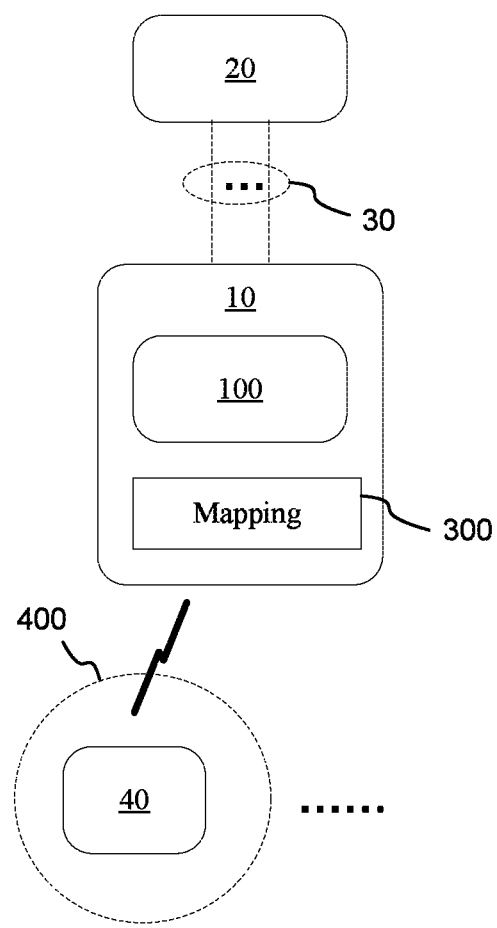
FIG. 1 is a block diagram illustrating an example system according to present disclosure.

A network device, e.g. an access point (AP), may forward data between a plurality of client devices and a neighbor network device, e.g. another AP, such that the plurality of client devices may communicate with an external system by accessing the neighbor network device via the network device. The operating mode of the network device forwarding the data between a plurality of client devices and a neighbor network device may be regarded as a bridge mode. In one example, a neighbor network device may refer to any network device that can operate on a same channel as that network device and physically located within a radio frequency coverage area of that network device.

Wireless or wired links may be established between the network device and the plurality of client devices, which may be regarded as down associations. If the plurality of client devices belongs to different VLANs, the down association between the network device and each of the plurality of client devices can serve in the VLAN corresponding to a respective client device.

A wireless link may be established between the network device and the neighbor network device, which may be regarded as an uplink. The network device may wirelessly transmit the data to or wirelessly receive the data from the neighbor network device based on the uplink. The network device may wirelessly transmit the data to or wirelessly receive the data from the neighbor network device via the uplink by utilizing a service set identifier (SSID) corresponding to the specified VLAN, and that SSID may be unusable or invalid for other VLANs. In other words, the wireless uplink cannot support the network device, e.g. operating in the bridge mode, in forwarding the data from the client devices in different VLANs and to neighbor network device. Thus, the link between the network device and neighbor network device may serve in one specified VLAN and cannot serve for the client devices in other VLANs.

In order to forward the data from the client devices in different VLANs to the neighbor network device, the network device may establish a plurality of links between the network device and the neighbor network device for the client devices in different VLANs, the links between the network device and the neighbor network device may be regarded as uplinks.

When forwarding the data between one of the client devices in different VLANs and the neighbor network device, the network device may emulate that client device transmitting the data to or receiving the data from the neighbor network device via the corresponding one of the plurality of links.

The network device may create mappings between the established links and the VLANs (e.g. the VLANs of the client devices and/or the VLAN of the network device), and may select the link or determine the VLAN by looking up the mapping.

Based on the plurality of links, the wireless uplink may support data forwarding of multiple VLANs, and the data corresponding to the client devices in different VLANs may be forwarded via the plurality of links, respectively, by the network device utilizing the mapping.

In one example, a first network device comprising a processor to: establish a plurality of links associating between the first network device and a second network device, the plurality of links corresponding to a plurality of virtual local area networks (VLANs) that a plurality of client devices associated with the first network device belong to; create a mapping between the plurality of links and the plurality of VLANs; and forward data received from a particular client device among the plurality of client devices in a particular VLAN of the plurality of VLANs to the second network device via a particular link corresponding to the particular VLAN based on the mapping.

In another example, a method comprises: establishing, by a processor of a first network device, a plurality of links associating between the first network device and a second network device, the plurality of links corresponding to a plurality of virtual local area networks (VLANs) that a plurality of client devices associated with the first network device belong to; creating, by the processor, a mapping between the plurality of links and the plurality of VLANs; forwarding, by the processor, data received from a particular client device among the plurality of client devices in a particular VLAN of the plurality of VLANs to the second network device via a particular link corresponding to the particular VLAN based on the mapping.

In another example, a non-transitory computer readable storage medium stores instructions that, when executed by a processor of a first network device, causes the processor to: establish a plurality of links associating between the first network device and a second network device, the plurality of links corresponding to a plurality of virtual local area networks (VLANs) that a plurality of client devices associated with the first network device belong to; create a mapping between the plurality of links and the plurality of VLANs; and forward data received from a particular client device among the plurality of client devices in a particular VLAN of the plurality of VLANs to the second network device via a particular link corresponding to the particular VLAN based on the mapping.

As used herein, a "network device" generally includes a device that is adapted to transmit and/or receive signaling and to process information within such signaling and to provide wireless local area network services to a station (e.g., any data processing equipment such as a computer, cellular phone, personal digital assistant, tablet devices, etc.). The "network device" may include access points, data transfer devices, network switches, routers, controllers, etc. As used herein, an "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

It is appreciated that examples described herein below may include various components and features. Some of the components and features may be removed and/or modified without departing from a scope of the device, method and non-transitory computer readable storage medium for. It is also appreciated that, in the following description, numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example. As used herein, a component is a combination of hardware and software executing on that hardware to provide a given functionality.

FIG. 1 is a block diagram illustrating an example system according to present disclosure. Referring to FIG. 1, the system may include a first network device 10 such as an AP, and a second network device 20 such as another AP.

The first network device 10 may include a processor 100. The processor 100 of the first network device 10 may establish a plurality of links 30 associating between the first network device 10 and a second network device 20. The plurality of links 30 may correspond to a plurality of VLANs 400 that a plurality of client devices 40 associated with the first network device 10 belong to.

For example, the processor 100 of the first network device 10 may collect the media access control (MAC) addresses of the client devices 40, and establish the plurality of links 30 associating between the first network device 10 and a second network device 20 and corresponding to the plurality of VLANs 400 that a plurality of client devices 40 associated with the first network device 10 belong to, by utilizing the collected MAC addresses.

The client devices 40 may include wireless client device. The wireless client device may be a smartphone, a mobile phone, a Personal Digital Assistant (PDA), a portable personal computer, an AIO (all-in-one) computing device, a notebook, a convertible or hybrid notebook, a netbook, a tablet, a cellular device, a desktop computer, a multimedia player, an entertainment unit, a data communication device, a portable reading device, or any other computing device capable of transmitting and receiving wireless transmissions.

The client devices 40 may also include wired client device. The wired client device may be a portable personal computer, a computing device, a notebook, a convertible or hybrid notebook, a netbook, a desktop computer, a multimedia player, an entertainment unit, a data communication device, a portable reading device, or any other computing device capable of transmitting and receiving wired transmissions.

The first network device 10 may belong to a VLAN different from the plurality of VLANs 400 or may belong to one of VLANs 400. The first network device 10 may also belong to multiple VLANs including the VLAN different from the plurality of VLANs 400 and at least one of VLANs 400.

In one example, the VLAN of the first network device may different from the VLANs of the client devices 40, and the processor 100 of the first network device 10 may establish a link associating between the first network device 10 and the second network device 20 and corresponding to the VLAN that the first network device 10 belongs to.

The link corresponding to the VLAN of the first network device 10 may be a primary association, and the processor 100 of the first network device 10 may receive an internet protocol (IP) address assigned for the first network device 10 from the second network device 20 via the primary association. The IP address assigned for the first network device 10 may be a management IP address, and the first network device 10 may be managed by an administrating device based on the management IP address.

The processor 100 of the network device 10 may create a mapping 300 between the plurality of links 30 and the plurality of VLANs 400.

In some cases, the mapping 300 may include a relationship between association identifiers (AIDs) of the plurality of links 30 and virtual local area network identifiers (VLAN IDs) of the plurality of VLANs 400.

In the case of establishing the primary association for the VLAN of the first network device 10, the mapping 300 may further include the relationship between AIDs of the primary link and the VLAN of the first network device 10.

The processor 100 of the first network device 10 may forward data between the client device 40 in one of the plurality of VLANs 400 and the second network device 20 via a corresponding one of the plurality of links 30, by utilizing the mapping 300. For example, the processor 100 of the first network device 10 may forward data received from a particular client device among the plurality of client devices 40 in a particular VLAN of the plurality of VLANs 400 to the second network device 20 via a particular link corresponding to the particular VLAN based on the mapping 300.

In some cases, the processor 100 of the first network device 10 may select the corresponding one of the plurality of links 30 by looking up the mapping 300, in response to receiving the data from the particular client device among the plurality of client devices 40 in a particular VLAN of the plurality of VLANs 400.

In other cases, the processor 100 of the first network device 10 may also determine the at least one of the plurality of VLANs 400 that the client device corresponding to the data belongs to, by looking up the mapping 300, in response to receiving the data from the second network device 20 via a particular link of the plurality of links 30.

The second network device 20 may assign service set identifiers (SSIDs) corresponding to the plurality of VLANs 400, and may advertise the assigned SSIDs to the first network device 10. The processor 100 of the first network device 10 may receive the SSIDs from the second network device 20.

The first network device 10 may establish the plurality of links 30 associating between the first network device 10 and the second network device 20 by utilizing the collected MAC addresses, and the SSIDs assigned and advertised by the second network device 20 may be utilized by the first network device. Thus, the communication between the first network device 10 and the second network device 20 may be regarded, by the network device 20, as the communication between the client device 40 and the second network device 20. The network device 10 may emulate the client device 40 transmitting the data to or receiving the data from the second network device 20 via the corresponding one of the plurality of links 30.

The SSIDs advertised by the second network device 20 may be not further advertised from the first network device 10 to the client devices 40. The first network device 10 may advertise SSIDs assigned by its own to wireless client devices included in the client devices 40, and the first network device 10 may not assign SSID for wired client device included in the client devices 40.

FIG. 2A to FIG. 2D are block diagrams illustrating an example case of a bridge mode forwarding via a wireless link for multiple VLANs in the system according to present disclosure.

In the example shown in FIG. 2A to FIG. 2D, the client devices 40 may include a wireless client device 41 belonging to a first VLAN 410, another wireless client device 41 and a wired client device 43 belonging to a second VLAN 420.

Figure 2A:
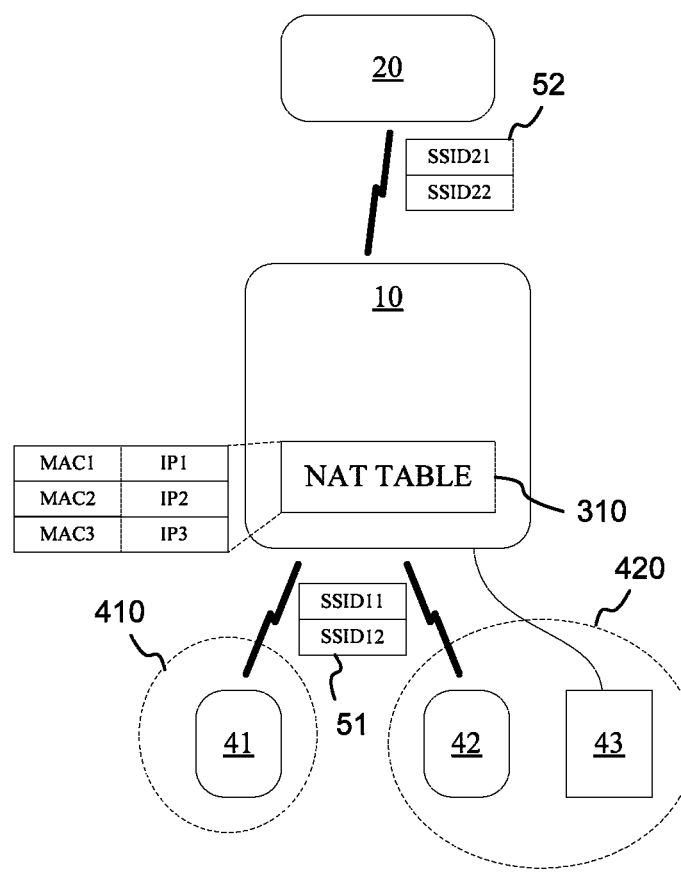
FIG. 2A to FIG. 2D are block diagrams illustrating an example case of a bridge mode forwarding via a wireless link for multiple VLANs in the system according to present disclosure.

Referring to FIG. 2A, the first network device 10 may advertise SSIDs 51 to the wireless client devices 41 and 42 via corresponding wireless down associations, and the second network device 20 may advertise SSIDs 52 to the first network device 10 via the wireless uplink.

The SSIDs 51 advertised by the first network device 10 may be assigned by the first network device 10, and may include SSIDs corresponding to the wireless client devices 41 and 42, e.g. SSID11 and SSID 12.

The SSIDs 52 advertised by the second network device 20 may be assigned by the second network device 20, and may include SSIDs corresponding to the first VLAN 410 that the wireless client device 41 belongs to, and corresponding to the second VLAN 420 that the wireless client device 42 and the wired client device 43 belong to, respectively, e.g. SSID21 and SSID 22.

The first network device 10 may also store a network address translation (NAT) table 310 including relationships between MAC addresses and IP addresses of the wireless client devices 41 and 42 and the wired client device 43, e.g. a relationship between the MAC address "MAC1" and IP address "IP1" of the wireless client device 41, a relationship between the MAC address "MAC2" and IP address "IP2" of the wireless client device 42, and a relationship between the MAC address "MAC3" and IP address "IP3" of the wired client device 43.

Figure 2B:
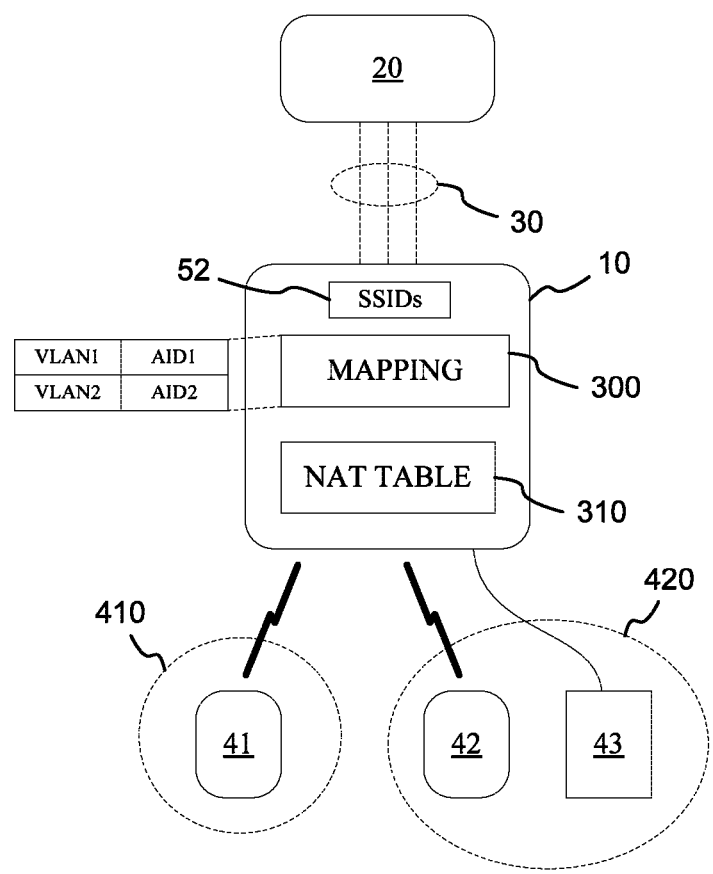

Referring to FIG. 2B, the first network device 10 may establish the plurality of links 30 associating between the first network device 10 and the second network device 20, the plurality of links 30 may at least include links corresponding to the first VLAN 410 that the wireless client device 41 belongs to, and corresponding to the second VLAN 420 that the wireless client device 41 and the wired client device 43 belong to, respectively. The first network device 10 may also create the mapping 300 between the plurality of links 30 and the first and second VLANs 410 and 420.

For example, the mapping 300 may at least include: a relationship between the VLAN ID "VLAN1" of the first VLAN 410 and AID1 of the link corresponding to the first VLAN 410 of the wireless client device 41, a relationship between the VLAN ID "VLAN2" of the second VLAN 420 and AID2 of the link corresponding to the second VLAN 420 of the wireless client device 42 and the wired client device 43.

It can be understood that a relationship between the VLAN ID "VLAN2" of the second VLAN 420 and AID5 of the link corresponding to the second VLAN 420 may be further included.

It can be understood that the second VLAN 420 including the wireless client device 42 and the wired client device 43 may correspond to one link identified by "AID2", or, the second VLAN 420 including the wireless client device 42 and the wired client device 43 may correspond to two links, e.g. the second VLAN 420 may correspond to two links identified by "AID2" and "AID3", respectively.

Figure 2C:
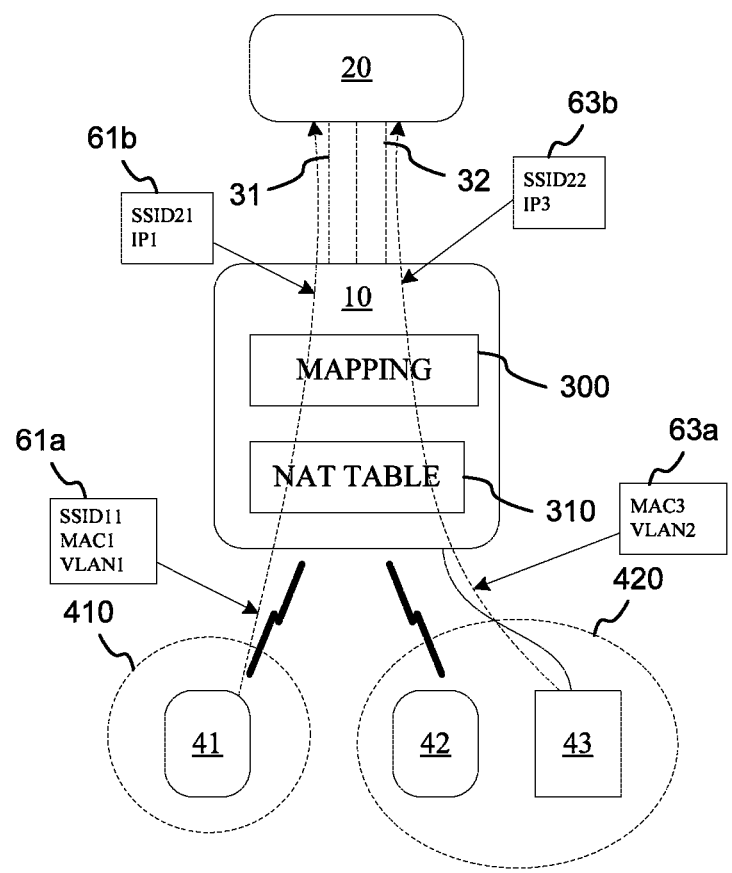

Referring to FIG. 2C, when receiving data 61*a* from the wireless client device 41 via the wireless down association by utilizing "SSID11" advertised by the first network device 10, the first network device 10 may translate the MAC address "MAC1" of the wireless client device 41 to the IP address "IP1" of the wireless client device 41 by utilizing the NAT table 310, and may look up the mapping 300 by utilizing the VLAN identifier "VLAN1" of the first VLAN 410 in the data 61*a*.

Based on the mapping 300, the first network device 10 may select the link 31 identified by corresponding "AID1", and forward the data 61*b* with the IP address "IP1" to the second network device 20 via the corresponding link 31, by utilizing "SSID21" corresponding to the first VLAN 410 and advertised by the second network device 20.

It is also shown in FIG. 2C, when receiving data 63*a* from the wired client device 43 via the wired connection, the first network device 10 may translate the MAC address "MAC3" of the wired client device 43 to the IP address "IP3" of the wired client device 43 by utilizing the NAT table 310, and may look up the mapping 300 by utilizing the VLAN identifier "VLAN2" of the second VLAN 420 in the data 63*a*.

Based on the mapping 300, the first network device 10 may select the link 32 identified by corresponding "AID2", and forward the data 63*b* with the IP address "IP3" to the second network device 20 via the corresponding link 32, by utilizing SSID22 corresponding to the second VLAN 420 and advertised by the second network device 20.

Figure 2D:
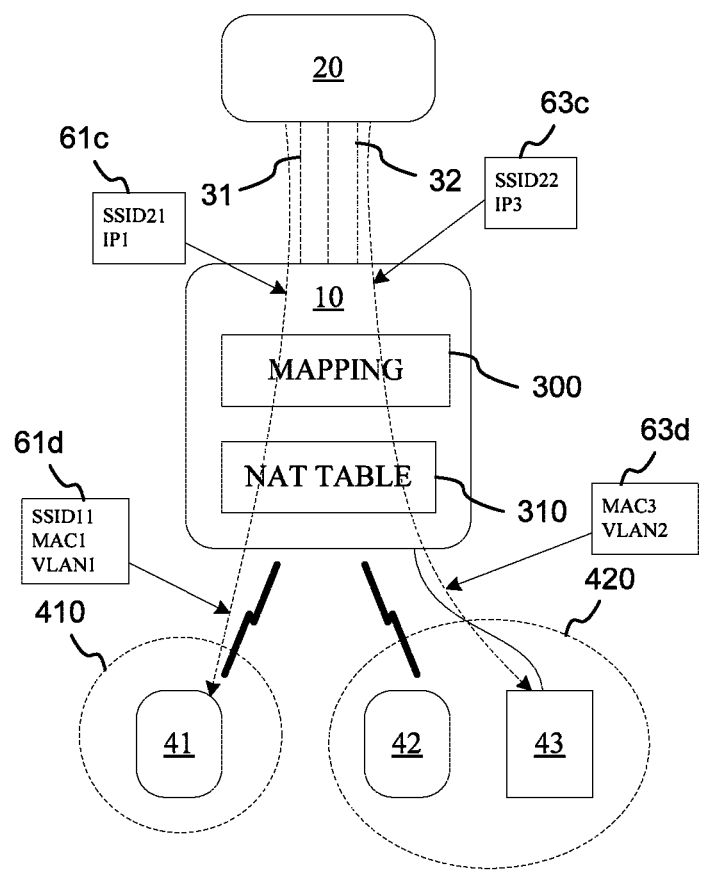

Referring to FIG. 2D, when receiving data 61*c* from the second network device 20 via the link 31 by utilizing "SSID21" advertised by the second network device 20, the first network device 10 may look up the mapping 300 by utilizing "AID1" corresponding to the link 31, so as to determine that the destination belongs to the first VLAN 410 identified by the VLAN identifier "VLAN1".

By utilizing the NAT table 310, the first network device 10 may also translate the IP address "IP1" of the wireless client device 41 to the MAC address "MAC1" of the wireless client device 41, and then forward the data 61*d* with the MAC address "MAC1" to the wireless client device 41 via the wireless down association by utilizing "SSID11" advertised by the first network device 10.

It is also shown in FIG. 2D, when receiving data 63c from the second network device 20 via the link 32 by utilizing "SSID22" advertised by the second network device 20, the first network device 10 may look up the mapping 300 by utilizing "AID2" corresponding to the link 32, so as to determine that the destination belongs to the second VLAN 420 identified by the VLAN identifier "VLAN2".

By utilizing the NAT table 310, the first network device 10 may also translate the IP address "IP3" of the wired client device 43 to the MAC address "MAC3" of the wired client device 43, and then forward the data 63d with the MAC address "MAC3" to the wired client device 43 via the wired connection.

Figure 3:
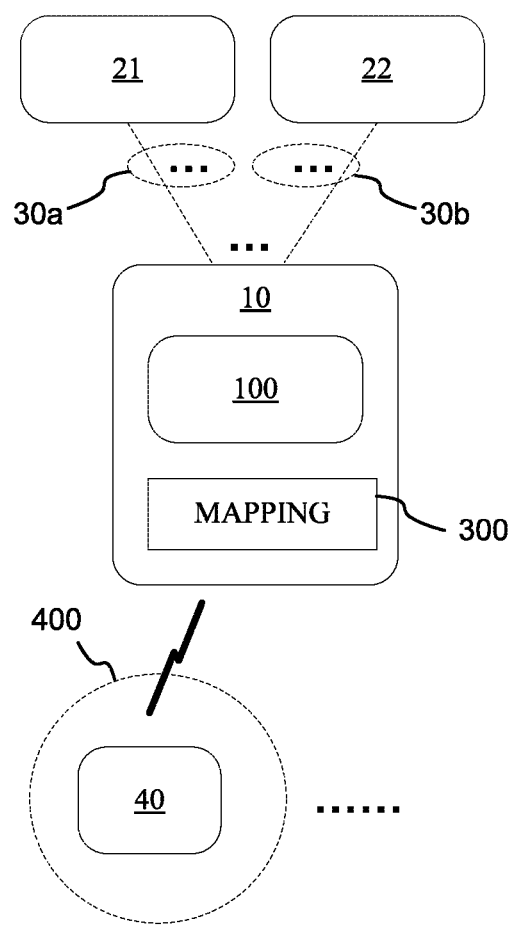
FIG. 3 is a block diagram illustrating another example system according to present disclosure.

FIG. 3 is a block diagram illustrating another example system according to present disclosure. Referring to FIG. 3, the system may include two neighbor network devices 21 and 22. The links 30 established in FIG. 1 may include two subsets 30a and 30b, one subset 30a may be established between the first network device 10 and the second network devices 21, and another subset 30b may be established between the first network device 10 and a third network device 22.

In other words, the plurality of links for different VLANs may be established between the first network device 10 and at least two neighbor network devices, respectively.

Figure 4:
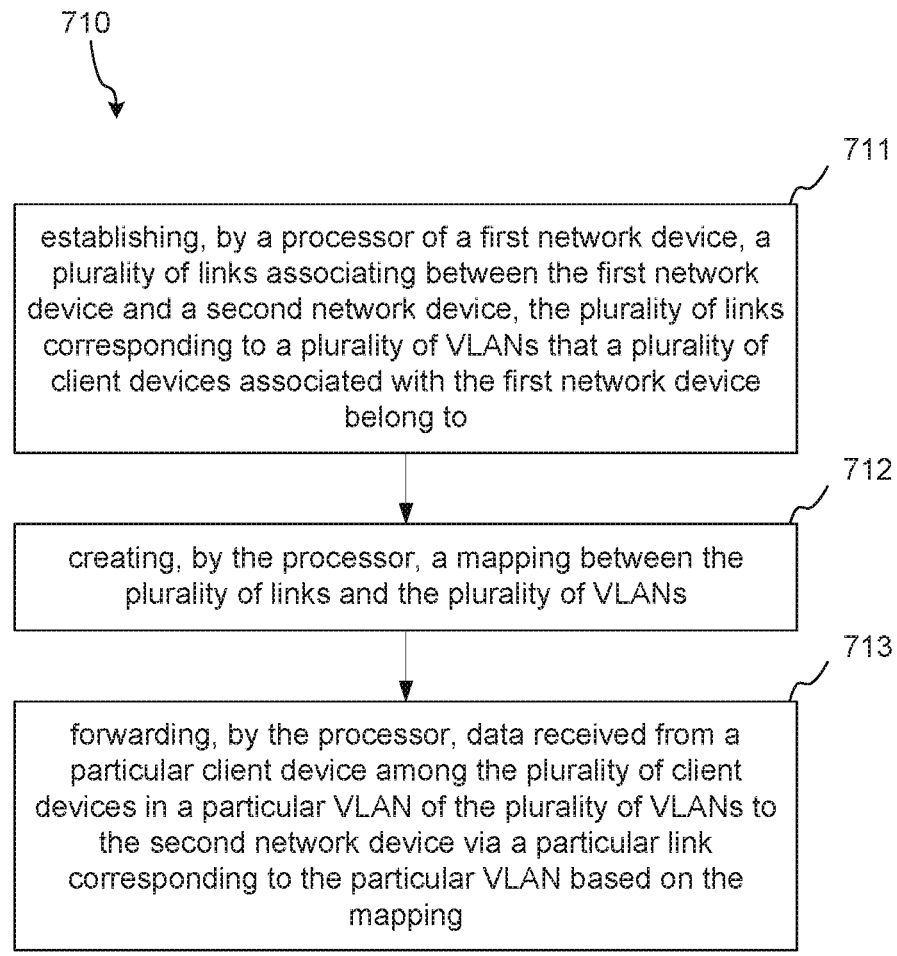
FIG. 4 is a flow chart illustrating an example method of mapping between wireless links and VLANs to support multiple VLANs via a wireless link according to present disclosure.

FIG. 4 is a flow chart illustrating an example method of mapping between wireless links and VLANs to support multiple VLANs via a wireless link according to present disclosure. Referring to FIG. 4:

The method 710 may comprise: establishing, by a processor of a first network device, a plurality of links associating between the first network device and a second network device, the plurality of links corresponding to a plurality of VLANs that a plurality of client devices associated with the first network device belong to, at 711.

For example, establishing, by utilizing the collected MAC addresses of the client device, the plurality of links associating between the first network device and a second network device and corresponding to the plurality of VLANs that the plurality of client devices belong to.

The method 710 may comprise: creating, by the processor, a mapping between the plurality of links and the plurality of VLANs, at 712.

In some cases, the mapping may include relationships between AIDs of the plurality of associations and VLAN IDs of the plurality of VLANs.

The method 710 may comprise: forwarding, by the processor, data received from a particular client device among the plurality of client devices in a particular VLAN of the plurality of VLANs to the second network device via a particular link corresponding to the particular VLAN based on the mapping, at 713.

In some cases, the network address translation (NAT) may be employed, when forwarding data between the client device in one of the plurality of VLANs and the second network device via a corresponding one of the plurality of links.

Figure 5:
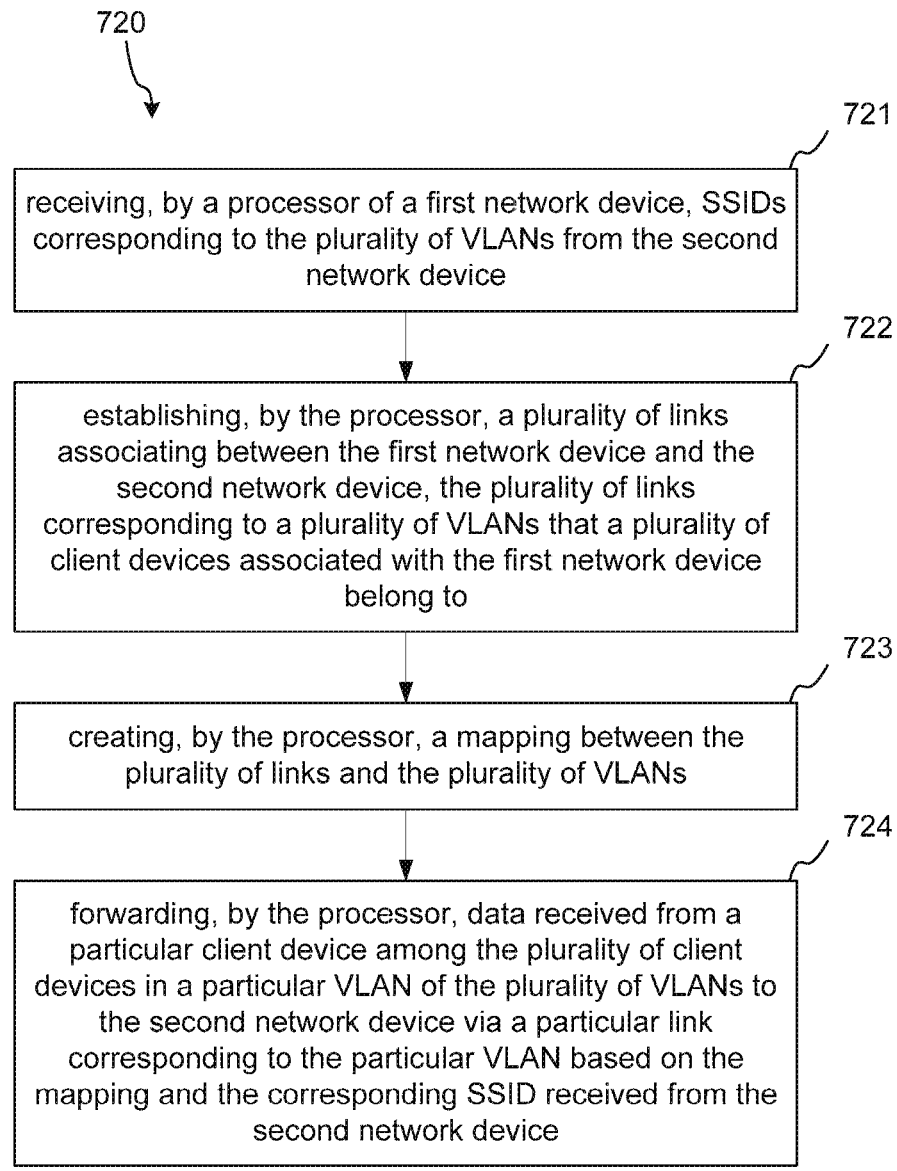
FIG. 5 is a flow chart illustrating another example method of mapping between wireless links and VLANs to support multiple VLANs via a wireless link according to present disclosure.

FIG. 5 is a flow chart illustrating another example method of mapping between wireless links and VLANs to support multiple VLANs via a wireless link according to present disclosure. Referring to FIG. 5:

The method 720 may comprise: receiving, by a processor of a first network device, SSIDs corresponding to the plurality of VLANs from the second network device, at 721.

The method 720 may comprise: establishing, by the processor, a plurality of links associating between the first network device and the second network device, the plurality of links corresponding to a plurality of VLANs that a plurality of client devices associated with the first network device belong to, at 722.

The method 720 may comprise: creating, by the processor, a mapping between the plurality of links and the plurality of VLANs, at 723.

The method 720 may comprise: forwarding, by the processor, data received from a particular client device among the plurality of client devices in a particular VLAN of the plurality of VLANs to the second network device via a particular link corresponding to the particular VLAN based on the mapping and the corresponding SSID received from the second network device, at 724.

Figure 6A:
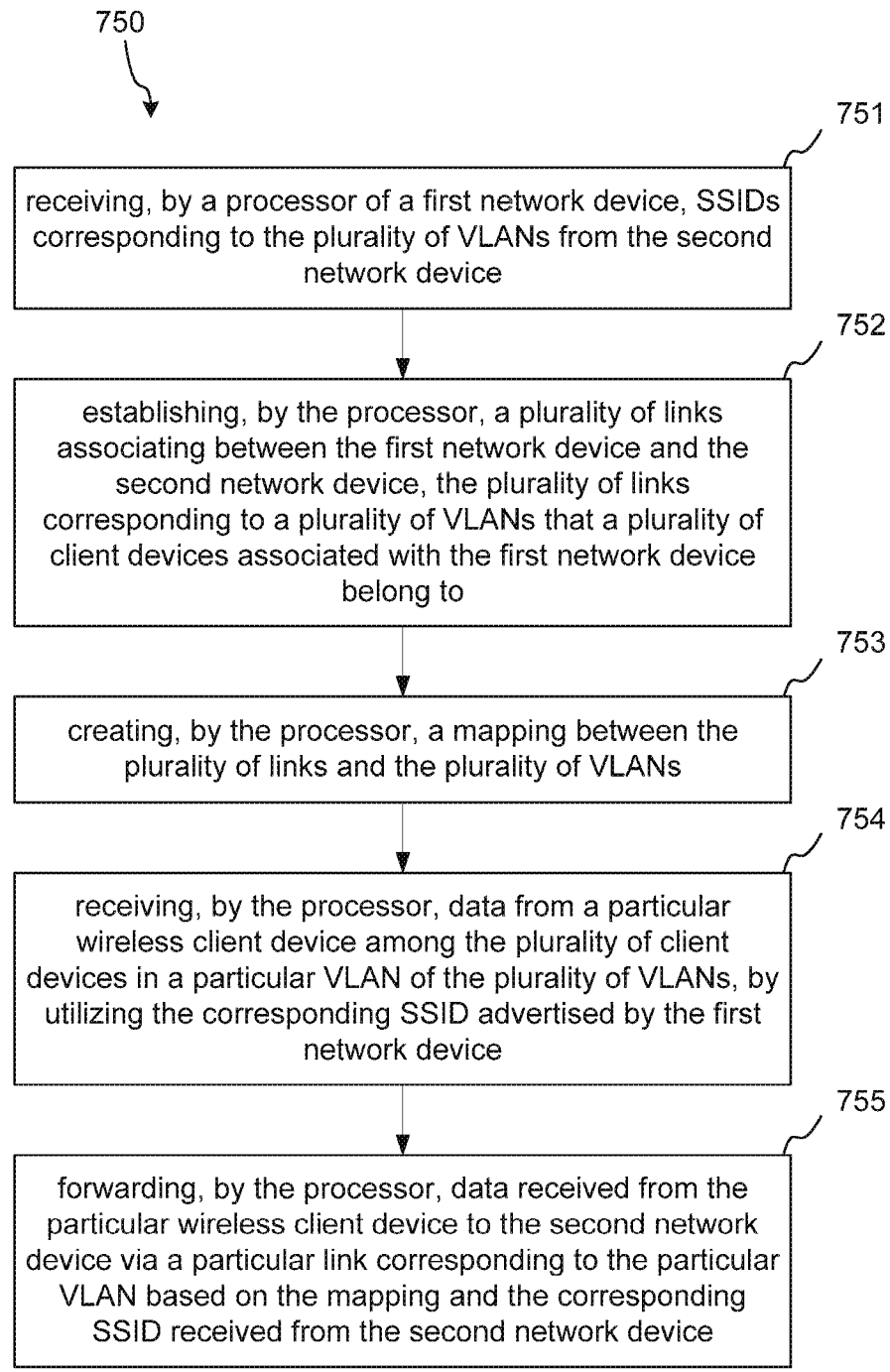
FIG. 6A and FIG. 6B are flow charts illustrating another example method of mapping between wireless links and VLANs to support multiple VLANs via a wireless link according to present disclosure.
Figure 6B:
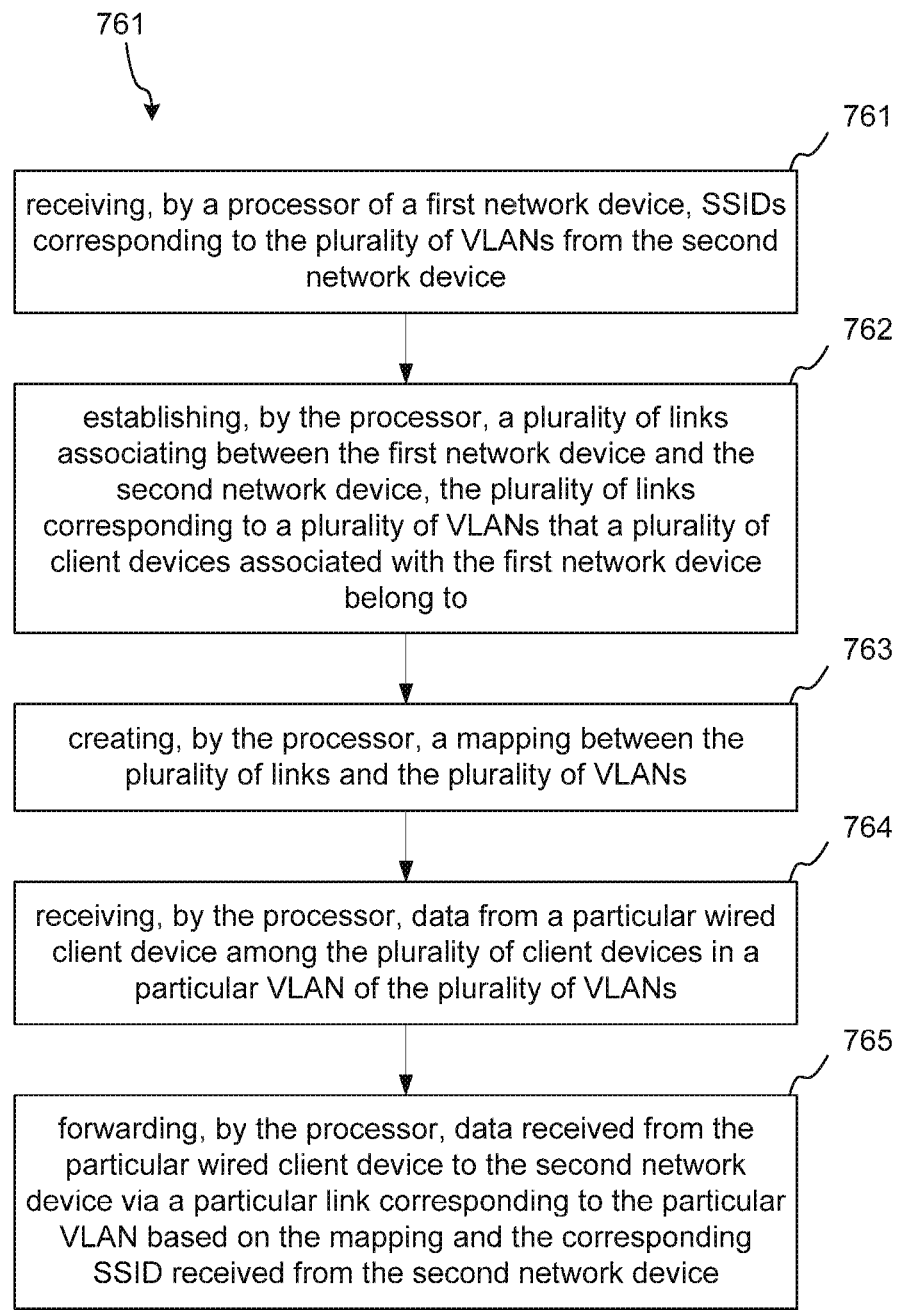

FIG. 6A and FIG. 6B are flow charts illustrating another example method of mapping between wireless links and VLANs to support multiple VLANs via a wireless link according to present disclosure.

Referring to FIG. 6A:

The method 750 may comprise: receiving, by a processor of a first network device, SSIDs corresponding to the plurality of VLANs from the second network device, at 751.

The method 750 may comprise: establishing, by the processor, a plurality of links associating between the first network device and the second network device, the plurality of links corresponding to a plurality of VLANs that a plurality of client devices associated with the first network device belong to, at 752.

The method 750 may comprise: creating, by the processor, a mapping between the plurality of links and the plurality of VLANs, at 753.

The method 750 may comprise: receiving, by the processor, data from a particular wireless client device among the plurality of client devices in a particular VLAN of the plurality of VLANs, by utilizing the corresponding SSID advertised by the first network device, at 754.

The method 750 may comprise: forwarding, by the processor, data received from the particular wireless client device to the second network device via a particular link corresponding to the particular VLAN based on the mapping and the corresponding SSID received from the second network device, at 755.

Referring to FIG. 6B:

The method 760 may comprise: receiving, by a processor of a first network device, SSIDs corresponding to the plurality of VLANs from the second network device, at 761.

The method 760 may comprise: establishing, by the processor, a plurality of links associating between the first network device and the second network device, the plurality of links corresponding to a plurality of VLANs that a plurality of client devices associated with the first network device belong to, at 762.

The method 760 may comprise: creating, by the processor, a mapping between the plurality of links and the plurality of VLANs, at 763.

The method 760 may comprise: receiving, by the processor, data from a particular wired client device among the plurality of client devices in a particular VLAN of the plurality of VLANs, at 764.

The method 760 may comprise: forwarding, by the processor, data received from the particular wired client device to the second network device via a particular link corresponding to the particular VLAN based on the mapping and the corresponding SSID received from the second network device, at 765.

Figure 7:
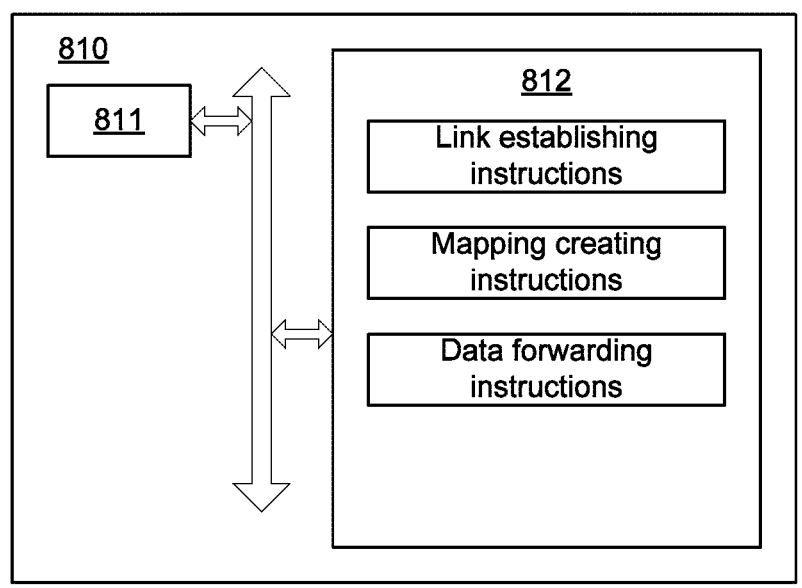
FIG. 7 is a block diagram illustrating an example network device according to present disclosure.

FIG. 7 is a block diagram illustrating an example network device according to present disclosure. Referring to FIG. 7, the first network device 810 may include a processor 811 and a non-transitory computer readable storage medium 812.

The non-transitory computer readable storage medium 812 may store instructions executable for the possessor 811.

The instructions may include link establishing instructions that, when executed by the processor 811, may cause the processor 811 to establish a plurality of links associating between the first network device and a second network device, the plurality of links corresponding to a plurality of VLANs that a plurality of client devices associated with the first network device belong to.

The instructions may include mapping creating instructions that, when executed by the processor 811, may cause the processor 811 to create a mapping between the plurality of links and the plurality of VLANs.

The instructions may include data forwarding instructions that, when executed by the processor 811, may cause the processor 811 to forward data received from a particular client device among the plurality of client devices in a particular VLAN of the plurality of VLANs to the second network device via a particular link corresponding to the particular VLAN based on the mapping.

Figure 8:
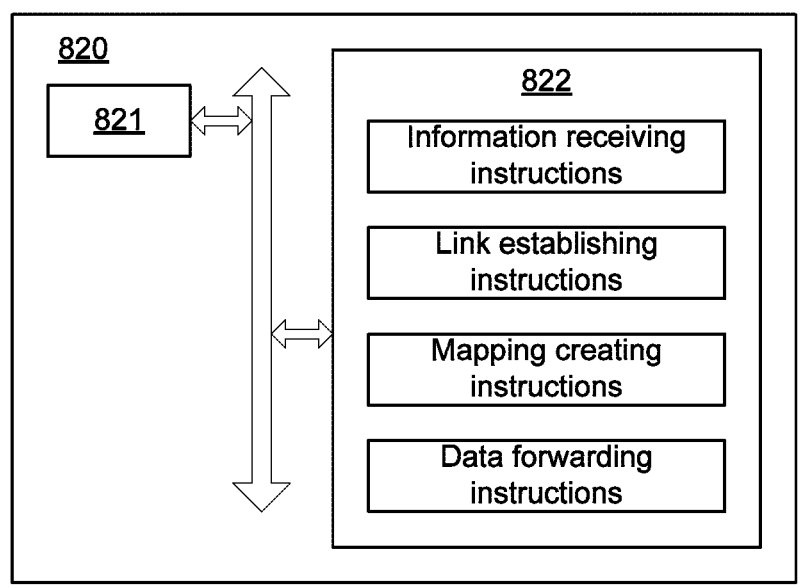
FIG. 8 is a block diagram illustrating another example network device according to present disclosure.

FIG. 8 is a block diagram illustrating another example network device according to present disclosure. Referring to FIG. 8, the first network device 820 may include a processor 811 and a non-transitory computer readable storage medium 822.

The non-transitory computer readable storage medium 822 may store instructions executable for the possessor 821.

The instructions may include information receiving instructions that, when executed by the processor 821, may cause the processor 821 to receive SSIDs corresponding to the plurality of VLANs from the second network device.

The instructions may include association establishing instructions that, when executed by the processor 821, may cause the processor 821 to establish a plurality of links associating between the first network device and a second network device, the plurality of links corresponding to a plurality of VLANs that a plurality of client devices associated with the first network device belong to.

The instructions may include mapping creating instructions that, when executed by the processor 821, may cause the processor 821 to create a mapping between the plurality of links and the plurality of VLANs.

The instructions may include data forwarding instructions that, when executed by the processor 821, may cause the processor 821 to forward data received from a particular client device among the plurality of client devices in a particular VLAN of the plurality of VLANs to the second network device via a particular link corresponding to the particular VLAN based on the mapping and the corresponding SSID received from the second network device.

While the present disclosure has been described in connection with certain example embodiments, it is to be understood that the disclosure is not limited to the disclosed embodiments, but, on the contrary, is intended to cover various modifications and equivalent arrangements included within the spirit and scope of the appended claims, and equivalents thereof.

What is claimed is:

1. A first network device comprising a processor to:
   establish a plurality of links associating between the first network device and a second network device, the plurality of links corresponding to a plurality of virtual local area networks (VLANs) that a plurality of client devices associated with the first network device belong to;
   create a mapping between the plurality of links and the plurality of VLANs; and
   forward data received from a particular client device among the plurality of client devices in a particular VLAN of the plurality of VLANs to the second network device via a particular link corresponding to the particular VLAN based on the mapping, wherein the first network device emulates the particular client device when forwarding the data through a link of the plurality of links that corresponds to the plurality of VLANs and the particular client device.

2. The first network device of claim 1, wherein the processor is further to:
   select the corresponding one of the plurality of links by looking up the mapping, in response to receiving the data from the client device in the particular VLAN.

3. The first network device of claim 1, wherein the processor is further to:
   determine the VLAN that the client device corresponding to the data belongs to, by looking up the mapping, in response to receiving the data from the second network device via a particular link of the plurality of links.

4. The first network device of claim 1, wherein the processor is further to:
   receive service set identifiers (SSIDs) corresponding to the plurality of VLANs from the second network device.

5. The first network device of claim 1, wherein the processor is further to:
   establish a link associating between the first network device and the second network device and corresponding to the VLAN that the first network device belongs to.

6. The first network device of claim 5, wherein the processor is further to:
   receive an IP address assigned for the first network device from the second network device via the link corresponding to the VLAN that the first network device belongs to.

7. The first network device of claim 1, wherein the network device comprises an access point (AP), and the neighbor network device comprises another AP.

8. A method comprising:
   establishing, by a processor of a first network device, a plurality of links associating between the first network device and a second network device, the plurality of links corresponding to a plurality of virtual local area networks (VLANs) that a plurality of client devices associated with the first network device belong to;
   creating, by the processor, a mapping between the plurality of links and the plurality of VLANs;
   forwarding, by the processor, data received from a particular client device among the plurality of client devices in a particular VLAN of the plurality of VLANs to the second network device via a particular link corresponding to the particular VLAN based on the mapping, wherein the first network device emulates the particular client device when forwarding the data through a link of the plurality of links that corresponds to the plurality of VLANs and the particular client device.

9. The method of claim 8, further comprising:
   selecting, by the processor, the corresponding one of the plurality of links by looking up the mapping, in response to receiving the data from the client device in the particular VLAN.

10. The method of claim 8, further comprising:
determining, by the processor, the VLAN that the client device corresponding to the data belongs to, by looking up the mapping, in response to receiving the data from the second network device via a particular link of the plurality of links.

11. The method of claim 8, further comprising:
receiving, by the processor, service set identifiers (SSIDs) corresponding to the plurality of VLANs from the second network device.

12. The method of claim 8, further comprising:
establishing, by the processor, a link associating between the first network device and the second network device and corresponding to the VLAN that the first network device belongs to.

13. The method of claim 8, further comprising:
receiving, by the processor, an IP address assigned for the first network device from the second network device via the link corresponding to the VLAN that the first network device belongs to.

14. A non-transitory computer readable storage medium storing instructions that, when executed by a processor of a first network device, causes the processor to:
establish a plurality of links associating between the first network device and a second network device, the plurality of links corresponding to a plurality of virtual local area networks (VLANs) that a plurality of client devices associated with the first network device belong to;
create a mapping between the plurality of links and the plurality of VLANs; and
forward data received from a particular client device among the plurality of client devices in a particular VLAN of the plurality of VLANs to the second network device via a particular link corresponding to the particular VLAN based on the mapping, wherein the first network device emulates the particular client device when forwarding the data through a link of the plurality of links that corresponds to the plurality of VLANs and the particular client device.

15. The non-transitory computer readable storage medium of claim 14, wherein instructions that, when executed by the processor, further cause the processor to:
receive service set identifiers (SSIDs) corresponding to the plurality of VLANs from the second network device.

16. The non-transitory computer readable storage medium of claim 14, wherein instructions that, when executed by the processor, further cause the processor to establish the plurality of links by collecting a plurality of service set identifiers corresponding to the plurality of VLANs.

17. The non-transitory computer readable storage medium of claim 14, wherein instructions that, when executed by the processor, further cause the processor to determine the VLAN that the client device corresponding to the data belongs to, by looking up the mapping, in response to receiving the data from the second network device via a particular link of the plurality of links.

18. The non-transitory computer readable storage medium of claim 14, wherein instructions that, when executed by the processor, further cause the processor to select the corresponding one of the plurality of links by looking up the mapping, in response to receiving the data from the client device in the particular VLAN.

19. The non-transitory computer readable storage medium of claim 14, wherein instructions that, when executed by the processor, further cause the processor to establish a link associating between the first network device and the second network device and corresponding to the VLAN that the first network device belongs to.

20. The non-transitory computer readable storage medium of claim 14, wherein instructions that, when executed by the processor, further cause the processor to receive, by the processor, an IP address assigned for the first network device from the second network device via the link corresponding to the VLAN that the first network device belongs to.

* * * * *